(12) United States Patent
Naumann et al.

(10) Patent No.: US 8,871,880 B2
(45) Date of Patent: Oct. 28, 2014

(54) SUPERABSORBENT COPOLYMER

(75) Inventors: Matthias Naumann, Hamburg (DE); James S. Wooten, IV, Greensboro, NC (US)

(73) Assignee: Evonik Corporation, Parsippany, NJ (US)

( * ) Notice: Subject to any disclaimer, the term of this patent is extended or adjusted under 35 U.S.C. 154(b) by 352 days.

(21) Appl. No.: 13/426,936

(22) Filed: Mar. 22, 2012

(65) Prior Publication Data

US 2013/0253158 A1    Sep. 26, 2013

(51) Int. Cl.
*C08F 220/06* (2006.01)
*C08F 220/38* (2006.01)

(52) U.S. Cl.
CPC ............ *C08F 220/06* (2013.01); *C08F 220/38* (2013.01)
USPC .... 526/240; 526/287; 526/318.41; 526/318.5

(58) Field of Classification Search
CPC . C08F 220/30; C08F 216/1466; C08F 220/38
See application file for complete search history.

(56) References Cited

U.S. PATENT DOCUMENTS

| | | | | |
|---|---|---|---|---|
| 5,273,716 | A * | 12/1993 | Northrup et al. | 422/82.07 |
| 6,211,400 | B1 | 4/2001 | Berghofer et al. | |
| 7,390,462 | B2 * | 6/2008 | Rao et al. | 422/82.08 |
| 7,816,426 | B2 | 10/2010 | Ahmed et al. | |
| 8,476,189 | B1 * | 7/2013 | Naumann et al. | 502/404 |
| 2011/0303872 | A1 | 12/2011 | Herfert et al. | |

FOREIGN PATENT DOCUMENTS

| | | |
|---|---|---|
| CN | 101475266 | 7/2009 |
| DE | 60026269 T2 | 11/2006 |
| FR | 2797877 A1 | 3/2001 |
| WO | WO 0144403 A1 * | 6/2001 |
| WO | 2011157656 A2 | 12/2011 |

OTHER PUBLICATIONS

"Fluorescent Monomers—Polymerizable Fluorescent Compounds," copyright date unknown, Polysciences, Inc., Technical Data Sheet # 513.
Hunger, "Optical Brighteners," copyright date unknown, Industrial Dyes—Chemistry, Property, Applications, Chapter 7, pp. 585-624, Wiley-VCH.
Naumann et al., International Application No. PCT/US2011/068143, filed Dec. 30, 2011.
Naumann et al., U.S. Appl. No. 13/341,132, filed Dec. 30, 2011.
"Optical Brightener," copyright Jan. 2011, Wikipedia, web page, en.wikipedia.org/wiki/Optical_brightener.
"Pyranine—Compound Summary," copyright Jan. 2011, PubChem Compound, web page, pubchem.ncbi.nlm.nih.gov/summary/summary.cgi?cid=61388.
International Search Report mailed on Jun. 18, 2013 in PCT/EP2013/055215.
Written Opinion mailed on Jun. 18, 2013 in PCT/EP2013/055215.

* cited by examiner

*Primary Examiner* — Nicole M Buie-Hatcher
(74) *Attorney, Agent, or Firm* — Smith Moore Leatherwood LLP; Philip P. McCann; John P. Zimmer

(57) ABSTRACT

The invention relates to a superabsorbent copolymer comprising a reaction product of a reactive optical brightener comonomer. In another embodiment, the superabsorbent copolymer comprises a reaction product of a first monomer and a reactive optical brightener comonomer. The reactive optical brightener comonomer may be selected from various pyrene optical brighteners listed herein. The invention also relates to superabsorbent copolymer having from about 0.1 to 10,000 ppm of a reactive optical brightener comonomer based on the superabsorbent copolymer.

19 Claims, No Drawings

SUPERABSORBENT COPOLYMER

FIELD OF THE INVENTION

A superabsorbent polymer in general refers to a water-swellable, water-insoluble, polymer capable of absorbing at least about 10 times its weight, and up to about 30 times or more its weight in an aqueous solution containing 0.9 weight percent sodium chloride solution in water. This invention is directed to a superabsorbent copolymer comprising a reaction product of a reactive optical brightener comonomer wherein the reactive optical brightener comonomer may react with a first monomer and is incorporated directly into or appended to the superabsorbent copolymer network as a comonomer or react with pendent groups of the polymer chains.

BACKGROUND

Examples of superabsorbent polymer may include a crosslinked partially neutralized polymer, generally referred to as superabsorbent polymer hydrogel, including crosslinked partially neutralized polyacrylic acids or crosslinked starch-acrylic acid graft polymers, that are capable of absorbing large amounts of aqueous liquids and body fluids, such as urine or blood, with swelling and the formation of superabsorbent polymer hydrogel, and of retaining the aqueous liquids under a certain pressure in accordance with the general definition of superabsorbent polymer.

The superabsorbent polymer hydrogel may be formed into particles, generally referred to as particulate superabsorbent polymer, wherein the particulate superabsorbent polymer may be post-treated with surface crosslinking, and/or other surface treatment to form particulate superabsorbent polymer compositions. The acronym SAP may be used herein in place of superabsorbent polymer, particulate superabsorbent polymer, superabsorbent polymer composition, particulate superabsorbent polymer compositions, or variations thereof. A comprehensive survey of superabsorbent polymers, and their use and manufacture, is given in F. L. Buchholz and A. T. Graham (editors) in "Modern Superabsorbent Polymer Technology," Wiley-VCR, New York, 1998.

Commercially available superabsorbent polymer include crosslinked polyacrylic acids or crosslinked starch-acrylic acid graft polymers, in which some of the carboxyl groups are partially neutralized with a sodium hydroxide solution or a potassium hydroxide solution, hence the term "partially neutralized".

A primary use of particulate superabsorbent polymer is in sanitary articles, such as babies' diapers, incontinence products, or sanitary towels. For fit, comfort, and aesthetic reasons, and from environmental aspects, there is an increasing trend to make sanitary articles smaller and thinner. This is being accomplished by reducing the content of the fluff fiber in these articles. To ensure a constant total retention capacity of body fluids in the sanitary articles, more particulate superabsorbent polymer content is being used in these sanitary articles.

Color is an important property of superabsorbent polymers wherein it is imperative to minimize the yellowness of the product. Widespread consumer preference for whiter superabsorbent polymer drives manufacturers to pursue more ways to accomplish this. A yellow-white product is undesirable. Countless studies suggest that consumers clearly favor a blue-white color over a yellow-white color. The former is perceived to be whiter, i.e., "fresh," "new," and "clean," while the latter is judged to be "old," "faded," and "dirty." Fluorescent additives can be used to enhance the appearance of the color of the polymer, causing a "whitening" effect, making materials look less yellow by increasing the overall amount of blue light reflected/emitted. In particular, in daylight, optical brighteners can thus compensate for the esthetically undesirable yellowish cast found in otherwise white (or colorless) polymers such as superabsorbent polymers.

US 2011/0303872 discloses water-absorbing polymer particles with improved color stability wherein the water-absorbing polymer particles comprise at least one optical brightener wherein the optical brightener is physically mixed with the superabsorbent polymer and/or is coated onto the superabsorbent polymer surface. In particular, US 2011/0303872 discloses that the optical brightener may be added before, during, or after the steps of i) polymerizing the polymer, ii) comminuting the polymer gel, iii) drying the polymer gel, iv) grinding and classifying the polymer gel, and optionally surface crosslinking the polymer particles. This method is still inadequate as to the bonding of the optical brightener to the superabsorbent polymer.

The present invention relates to superabsorbent copolymer comprising a reaction product of a first monomer and a reactive optical brightener comonomer, or methods to make such a superabsorbent copolymer wherein the reactive optical brightener reacts with the first monomer so as to be incorporated, directly into the polymer backbone or appended by reacting with groups of the monomer and/or the polymer, into the superabsorbent copolymer network.

SUMMARY

The present invention includes numerous embodiments, of which some are included herein. One embodiment of the present invention is a superabsorbent copolymer comprising a reaction product of a reactive optical brightener comonomer. Another embodiment of the present invention is a superabsorbent copolymer comprising a reaction product of a first monomer and a reactive optical brightener comonomer. In another embodiment, the present invention is directed to a superabsorbent copolymer comprising a reaction product of a first monomer and a reactive optical brightener comonomer wherein the reactive optical brightener comonomer reacts with the first monomer during polymerization to form network polymer chains in the superabsorbent copolymer wherein the reactive optical brightener comonomer is incorporated into the network polymer chains of the superabsorbent copolymer.

The reactive optical brightener comonomer may comprise an ethylenically unsaturated reactive optical brightener comonomer. Furthermore, the reactive optical brightener comonomer may comprise a pyrene derivative as selected from formulas 1-3:

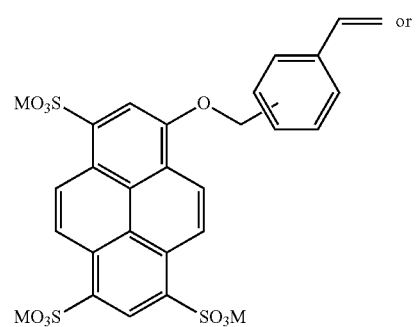

Formula 1

-continued

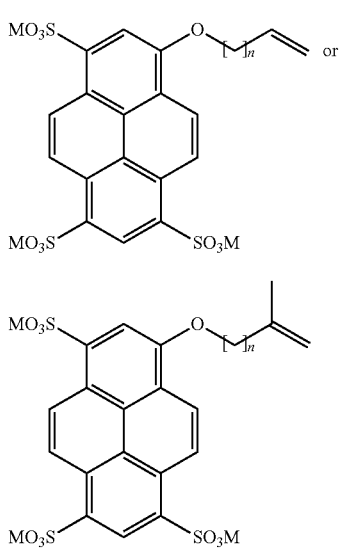

Formula 2 or

Formula 3 wherein M is selected from sodium, potassium, cesium, rubidium, lithium, ammonium, or hydrogen; and n is selected from 0, 1, 2, 3, 4, 5, 6, 7, 8, 9, or 10;
or selected from formula 4:

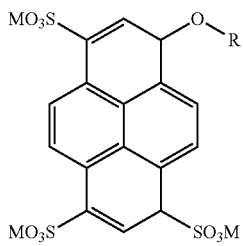

Formula 4 wherein M is selected from sodium, potassium, cesium, rubidium, lithium, ammonium, or hydrogen; and R is an ethylenically unsaturated organic moiety; or selected from formula 5:

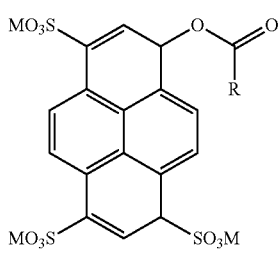

Formula 5 wherein M is selected from sodium, potassium, cesium, rubidium, lithium, ammonium, or hydrogen; and R is an ethylenically unsaturated organic moiety.

Yet another embodiment of the present invention is a superabsorbent copolymer comprising a reaction product of a) from about 55% to about 99.9% by weight of the superabsorbent copolymer of a first monomer based on the superabsorbent copolymer; b) from about 0.001% to about 5% by weight of internal crosslinking agent based on the first polymerizable monomer; and c) from about 0.1 to 10,000 ppm, or from about 0.1 to about 1000 ppm, or from about 0.1 to about 300 ppm based on the superabsorbent copolymer of a reactive optical brightener comonomer.

In addition, the present invention is directed to absorbent compositions or articles that may contain the superabsorbent copolymer of the present invention.

Definitions

It should be noted that when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture.

The term "absorbent article" generally refers to devices that can absorb and contain fluids. For example, personal care absorbent articles refer to devices that are placed against or near the skin to absorb and contain the various fluids discharged from the body.

The term "b*" as used herein generally refers to one coordinate of the CIE:L*a*b* color space specified by the International Commission on Illumination. The b* coordinate shows the color position between yellow and blue (negative values indicate blue and positive values indicate yellow).

The term "copolymer" as used herein generally means any polymer comprising the reaction product of at least one monomer comprising a reactive optical brightener comonomer. In one embodiment the "copolymer" is the reaction product of two or more monomers wherein the polymer is derived from at least two monomeric species, including a first monomer and a reactive optical brightener comonomer wherein the reactive optical brightener comonomer reacts with the first monomer during polymerization to form network polymer chains in the superabsorbent copolymer wherein the reactive optical brightener comonomer is incorporated, either directly into or appended to the network polymer chains of the superabsorbent copolymer. In another embodiment the copolymer is the reaction product of the reactive optical brightener comonomer and a polymer.

The term "covalently bond" as used here means a chemical link between two atoms in which electrons are shared between them.

The term "crosslinked" used in reference to the superabsorbent copolymer refers to any means for effectively rendering normally water-soluble polymers substantially water-insoluble but swellable. Such a crosslinking means can include, for example, physical entanglement, crystalline domains, covalent bonds, ionic complexes and associations, hydrophilic associations such as hydrogen bonding, hydrophobic associations, Van der Waals forces or dipole-dipole interactions.

The term "dry superabsorbent copolymer composition" as used herein generally refers to the superabsorbent copolymer composition having less than about 10% moisture.

The term "fluorescent" and "fluorescent activity" generally refers to the emission of electromagnetic radiation, especially of visible light, stimulated in a substance by the absorption of incident radiation and persisting only as long as the stimulating radiation is continued.

The term "optical brightener" shall mean dyes that absorb light in the ultraviolet and violet region (with the absorption maximum around 250-410 nm) of the electromagnetic spectrum, and reemit light in the blue region (with the emission maximum around 400-500 nm). Optical brightener may be referred to as a fluorescent whitening agent or a fluorescent brightening agent, and can provide optical compensation for the yellow cast in superabsorbent copolymers.

The terms "particle," "particulate," and the like, when used with the term "superabsorbent copolymer," refer to the form of discrete units. The units can comprise flakes, fibers, agglomerates, granules, powders, spheres, pulverized materials, or the like, as well as combinations thereof. The particles can have any desired shape: for example, cubic, rod-like, polyhedral, spherical or semi-spherical, rounded or semi-rounded, angular, irregular, et cetera. Shapes having a high aspect ratio, like needles, flakes, and fibers, are also contemplated for inclusion herein. The terms "particle" or "particulate" may also include an agglomeration comprising more than one individual particle, particulate, or the like. Additionally, a particle, particulate, or any desired agglomeration thereof may be composed of more than one type of material.

The term "polymer" includes, but is not limited to, homopolymers, copolymers, for example, block, graft, random, and alternating copolymers, terpolymers, etc., and blends and modifications thereof. Furthermore, unless otherwise specifically limited, the term "polymer" shall include all possible configurational isomers of the material. These configurations include, but are not limited to isotactic, syndiotactic, and atactic symmetries.

The term "reactive" as used herein in describing the reactive optical brightener comonomer means the reactive optical brightener comonomer combines chemically with the first monomer, or a polymer, to covalently bond to the superabsorbent copolymer network wherein the reactive optical brightener comonomer becomes part of the network chain of the copolymer or appends to the side groups of the superabsorbent copolymer network.

The term "surface crosslinking" means that the level of functional crosslinks in the vicinity of the surface of the superabsorbent polymer particle generally is higher than the level of functional crosslinks in the interior of the superabsorbent polymer particle. As used herein, "surface" describes the outer-facing boundaries of the particle. For porous superabsorbent copolymer particles, exposed internal surfaces also are included in the definition of surface.

The term "thermoplastic" describes a material that softens when exposed to heat and which substantially returns to a non-softened condition when cooled to room temperature.

The term "tracer" or "tracer element" when used herein as used herein generally refers to the reactive optical brightener comonomer which is an identifiable substance that is introduced into the superabsorbent copolymer and can be detected.

The term "% by weight" or "% wt" or "wt %" when used herein and referring to components of the superabsorbent copolymer composition, is to be interpreted as based on the weight of the dry superabsorbent copolymer composition, unless otherwise specified herein.

These terms may be defined with additional language in the remaining portions of the specification.

DETAILED DESCRIPTION

While typical aspects of embodiment and/or embodiments have been set forth for the purpose of illustration, this Detailed Description and the accompanying drawings should not be deemed to be a limitation on the scope of the invention. Accordingly, various modifications, adaptations, and alternatives may occur to one skilled in the art without departing from the spirit and scope of the present invention. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

The present invention includes numerous embodiments, of which some are included herein. One embodiment of the present invention is a superabsorbent copolymer comprising a reaction product of a reactive optical brightener comonomer. Another embodiment of the present invention is a superabsorbent copolymer comprising a reaction product of a first monomer and a reactive optical brightener comonomer. In another embodiment, the present invention is directed to a superabsorbent copolymer comprising a reaction product of a first monomer and a reactive optical brightener comonomer wherein the reactive optical brightener comonomer reacts with the first monomer to form network polymer chains in the superabsorbent copolymer wherein the reactive optical brightener comonomer is incorporated into the network polymer chains of the superabsorbent copolymer.

The reactive optical brightener comonomer may comprise an ethylenically unsaturated reactive optical brightener comonomer. In addition, the reactive optical brightener comonomer may comprise a pyrene derivate, as selected from formulas 1-3:

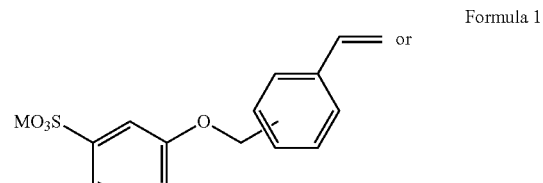

Formula 1

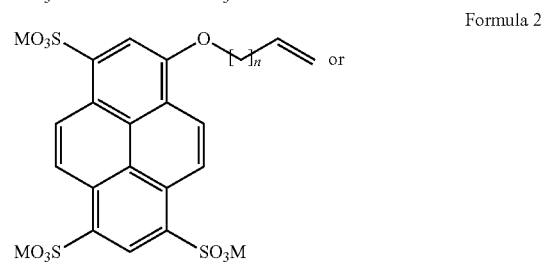

Formula 2

-continued

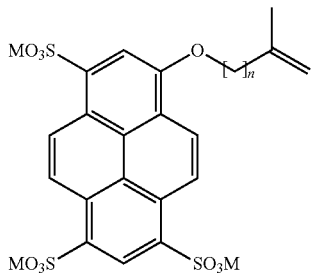

Formula 3 wherein M is selected from sodium, potassium, cesium, rubidium, lithium, ammonium, or hydrogen; and n is selected from 0, 1, 2, 3, 4, 5, 6, 7, 8, 9, or 10;
or selected from formula 4:

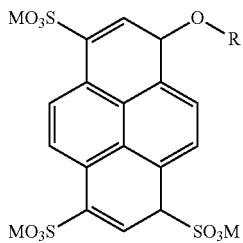

Formula 4 wherein M is selected from sodium, potassium, cesium, rubidium, lithium, ammonium, or hydrogen; and R is an ethylenically unsaturated organic moiety; or selected from formula 5:

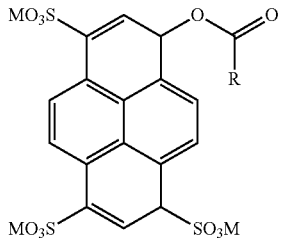

Formula 5 wherein M is selected from sodium, potassium, cesium, rubidium, lithium, ammonium, or hydrogen; and R is an ethylenically unsaturated organic moiety.

Yet another embodiment of the present invention is an superabsorbent copolymer comprising a reaction product of a) from about 55% to about 99.9% by weight of the superabsorbent copolymer of a first monomer based on the superabsorbent copolymer; and b) from about 0.001% to about 5% by weight of internal crosslinking agent based on the polymerizable unsaturated acid group containing monomer; and c) from about 0.1 to about 10,000 ppm, or from about 0.1 to about 1000 ppm, or from about 0.1 to about 300 ppm based on the superabsorbent copolymer of a reactive optical brightener comonomer.

The reactive optical brightener comonomer, or the reactive brightener comonomer bound to a carboxylic group or carboxylate salt or reacted into the polymer chain, may function as a tracer or tracer element in the superabsorbent copolymer wherein the reactive optical brightener comonomer may be detectable by the use of ultraviolet A, long wave, or black light (UV-A) to fluoresce the unsaturated, reactive optical brightener comonomer in the superabsorbent copolymer. In addition, in the case wherein the superabsorbent copolymer is mixed with other superabsorbent polymer not containing the optical brightener, the superabsorbent polymer containing the optical brightener will still be detectable by the use of UV-A.

The amount of the reactive optical brightener comonomer may be from about 0.1 to about 10,000 ppm, or from about 0.1 to about 1,000 ppm, or from about 0.1 to about 300 ppm, or from about 0.1 to 100 ppm based on the superabsorbent copolymer. In particular, the reactive optical brightener may be dissolved in deionized water to make a solution. The amount of reactive optical brightener specified in this application may be added to the first monomer solution at any time before polymerization or the reactive optical brightener comonomer may be added to the first monomer solution containing a monomer crosslinker additive.

In one embodiment, the reactive optical brightener comonomer can be covalently bonded to the polymer during polymerization such that the optical brightener comonomer becomes part of polymer backbone. This structure enhances the prevention of the optical brightener comonomer from leaching from the superabsorbent copolymer, or becoming an extractable from the superabsorbent copolymer.

The reactive optical brightener comonomer may be unsaturated and include aromatic or aromatic heterocyclic materials, often containing a condensed ring system. A feature that may be found in optical brighteners is the presence of a condensed ring system or an uninterrupted chain of conjugated double bonds associated with an aromatic ring. The number of such conjugated double bonds is dependent on substituents as well as the planarity of the fluorescent part of the molecule. In addition, the reactive optical brightener comonomer may be derived from (or derivatives of) commercially available brighteners, which may, in one embodiment, be chemically modified to become reactive optical brightener comonomers.

Another embodiment of the present invention is a superabsorbent copolymer comprising a reactive optical brightener comonomer comprising a pyrene derivate as shown in, but not limited to, formulas 1-5 as set forth above.

The pyrene derivatives may be synthesized, e.g. starting from pyranine, which is one of the common names of 8-Hydroxy-1,3,6-pyrenetrisulfonic acid, trisodium salt or trisodium 8-hydroxypyrene-1,3,6-trisulphonate (CAS-no. 6358-69-6), and an ethylenically unsaturated, etherifying agent selected from, but not limited to, 3-vinylbenzyl chloride or bromide, 4-vinylbenzyl chloride or bromide, a mixture of 3- and 4-vinylbenzyl chloride or bromide, or methallyl halides, such as methallyl chloride or methallyl bromide, or allyl halides, such as allychloride or allylbromide, or, 4-bromo-1-butene, 5-bromo-1-pentene, 6-bromo-1-hexene, 7-bromo-1-heptene, 8-bromo-1-octene, 9-Brome-1-nonene, 10-bromo-1-decene, 11-bromo-1-undecene, or 12-bromo-1-dodecene.

The pyrene derivatives of formula 5 can be synthesized e.g. starting from pyranine and ethylenically unsaturated esterifying or acylating agents, selected from, but not limited to, acryloyl chloride, methacryloyl chloride, acrylic acid anhydride, methacrylic acid anhydride, derivatives of benzyl halides such as vinyl benzyl halides, including ethylenically unsaturated moieties containing polycyclic, aromatic acyl halides, or unsaturated aliphatic acyl halides, or reaction products of phosgene (carbonyl dichloride) with ethylenically unsaturated organic nucleophiles or bifunctional alcohols and amines as examples.

In another embodiment, the reactive optical brightener comonomer may be synthesized, such as Optical Brightener Comonomer 1 and 2 (OBC1 and OBC2) as shown in the examples herein. For example, the respective reactive optical brighteners may be prepared through the reaction of pyranine, also known as 8-hydroxy-1,3,6-pyrene trisulfonic acid trisodium salt (available from Sigma-Aldrich and from TCI America), and an electrophile, such as 3-vinylbenzyl chloride, 4-vinylbenzyl chloride, a mixture of 3- and 4-vinyl benzyl chloride, allyl halide such as allyl chloride or allyl bromide, for n=1; 4-bromo-1-butene, for n=2; 5-bromo-1-pentene, for n=3; 6-bromo-1-hexene, for n=4; 8-bromo-1-octene, for n=6; 9-bromo-1-nonen, for n=7; 10-bromo-1-decen, for n=8; 11-bromo-1-undecene, for n=9,12-bromo-1-dodecene, for n=10, and methallyl halides, such as methallylbromide or methallylchloride. Some of these alkylating agents may be available from Aldrich Chemical Company, P.O. Box 2060, Milwaukee, Wis. 53201 USA. In addition to Aldrich as a source, the mixture of 3-vinyl benzyl chloride and 4-benzyl chloride is available from The Dow Chemical Company, 2020 Dow Center, Midland Mich. 48686.

The reaction of pyranine and an electrophile may be accomplished in a polar organic solvent. A base such as an alkali hydroxide including sodium hydroxide, may be used to deprotonate the pyranine A slight excess of the electrophile, respectively the alkylating agent, may be used to ensure complete conversion of pyranine to the desired monomer.

Although many organic solvents such as dimethyl sulfoxide (hereinafter "DMSO"), methanol, dimethylformamide and methylpyrrolidinone can be used in the reaction, wherein the reaction in DMSO is preferred since it gives near quantitative yield even at typical room temperatures of from about 20° C. to about 25° C. Higher reaction temperatures can be used to shorten the reaction time. Generally the reaction is carried out at a temperature in the range of about 20° C. to about 60° C. for a period of time in the range of about 3 to about 36 hours, based on the temperature.

The product may be collected by stripping off the solvent under reduced pressure. Alternatively, the product may be isolated by precipitation in acetone and recovery of the yellow solid. Further purification, to remove residual solvent, can be accomplished by washing or stirring the crude product with acetone or isopropanol followed by filtration.

The superabsorbent copolymer further includes a first monomer. A process to make a superabsorbent copolymer as set forth in embodiments of the present invention is obtained by the initial copolymerization of from about 55% to about 99.9% by weight of the first monomer with the reactive optical brightener comonomer. The first monomer may comprise anionic or cationic monomers. The term "anionic monomer" is intended to refer to a monomer comprising a functional group or groups having a potential for becoming negatively charged ions upon ionization in an aqueous solution. In general, suitable functional groups for an anionic monomer include, but are not limited to, carboxyl groups, sulfonate groups, sulphate groups, sulfite groups, and phosphate groups. Suitably, the functional groups are carboxyl groups. It is preferred that these functional groups are in neutralized form.

Examples of anionic monomers include the alkali metal and ammonium salts or partial salts of poly(acrylic acid), poly(methacrylic acid), hydrolyzed poly(acrylamides), maleic anhydride copolymers with vinyl ethers and alpha-olefins, poly(vinyl acetic acid), poly(vinyl sulfonic acid), poly(vinyl phosphonic acid), poly(vinyl ethers), poly(vinyl pyrrolidone), poly(vinylmorpholinone), poly(vinyl alcohol), and mixtures thereof. Examples of natural based anionic monomers include the salts or partial salts of carboxymethyl cellulose, carboxymethyl starch, alginates, and carrageenans. Other suitable examples of anionic monomers include synthetic polypeptides such as polyaspartic acid and polyglutamic acid The term "cationic monomer" as used herein refers to a monomer comprising a functional group or groups having a potential of becoming positively charged ions upon ionization in an aqueous solution. In general, suitable functional groups for a cationic monomer include, but are not limited to, primary, secondary, or tertiary amino groups, imino groups, imido groups, amido groups, and quaternary ammonium groups. Examples of cationic monomers include the salts or partial salts of poly(vinyl amines), poly(allylamines), poly (ethylene imine), poly(amino propanol vinyl ethers), poly (acrylamidopropyl trimethyl ammonium chloride), and poly (diallyldimethyl ammonium chloride). Examples of natural based cationic polymers include partially deacetylated chitin, chitosan and chitosan salts. Also synthetic polypeptides such as polyasparagins, polylysines, polyglutamines, polyarginines can be examples of the cationic polymers.

A suitable first monomer includes any of those containing carboxyl groups, such as acrylic acid, methacrylic acid, or 2-acrylamido-2-methylpropanesulfonic acid, or mixtures thereof. It is desirable for at least about 50% by weight, and more desirable for at least about 75% by weight of the acid groups to be carboxyl groups.

If the first monomer is an anionic monomer such as acrylic acid, then it is preferable that an acid group contained in the polyacrylic acid (salt)-based superabsorbent copolymer resin is partially neutralized in view of properties. A suitable degree of neutralization is at least 50 mol %, more suitably at least 60 mol %, and even more suitably at least 70 mol %. The acid group forms a monovalent salt such as an alkali metal salt of such as lithium, sodium, and potassium; an ammonium salt; an amine salt, by neutralization. An example of a neutralization agent is sodium hydroxide. Among these monovalent salts, it is preferable to be converted to an alkali metal salt.

It should be noted that, the neutralization step may be performed in any stage of the production process of the superabsorbent copolymer resin. For example, it may be performed to the unsaturated monomer of acrylic acid (salt) before polymerization, or a polymer after polymerization, or it is possible to be performed during a polymerization reaction, and further it is possible to use these in combination. In view of uniformity of the neutralization, it is preferable that the neutralization is performed at the stage of the unsaturated monomer of acrylic acid (salt).

If the first monomer comprises acrylic acid, then it is important to use acrylic acid that is known by its contents to be pure, that is the acrylic acid having at least 99.5 wt % concentration, or at least 99.7 wt % concentration, or at least 99.8% concentration. The principal component of this monomer may be either acrylic acid, or acrylic acid and an acrylate salt. Impurities in acrylic acid may include water, propionic acid, acetic acid, and diacrylic acid, commonly called acrylic acid dimer. Content of the diacrylic acid should be 1000 ppm or less, or 500 ppm or less, or 300 ppm or less, when the acrylic acid is used in the process. In addition, it is important to minimize the generation of β-hydroxyprionic acid during the neutralization process to less than about 1000 ppm, or less than about 500 ppm, of β-hydroxyprionic acid.

Moreover, in the acrylic acid, the content of protoanemonin and/or furfural is 0 to 20 ppm by weight in terms of the converted value based on acrylic acid. In light of improvement physical properties and characteristics of the water absorbing resin, the content of protoanemonin and/or furfural in the monomer is not higher than 10 ppm by weight, or from 0.01 to 5 ppm by weight, or from 0.05 to 2 ppm by weight, or from 0.1 to 1 ppm by weight in terms of the converted value based on acrylic acid.

Further, in the first monomer comprising acrylic acid, it is preferred that the amount of aldehyde component other than furfural and/or maleic acid is as small as possible for the same reason. Specifically, the content of the aldehyde component other than furfural and/or maleic acid may be from 0 to 5 ppm by weight, or from 0 to 3 ppm by weight, or from 0 to 1 ppm by weight, or 0 ppm by weight (not higher than detection limit) in terms of the converted value based on acrylic acid. Examples of the aldehyde component other than furfural include benzaldehyde, acrolein, acetaldehyde and the like.

Additionally, in the first monomer or superabsorbent copolymer of the present invention, content of saturated carboxylic acid consisting of acetic acid and/or propionic acid, not higher than 1000 ppm by weight, or from 10 to 800 ppm by weight, or from 100 to 500 ppm by weight in terms of the converted value based on acrylic acid.

The process to make the superabsorbent copolymer may begin with preparing a monomer solution. The monomer solution can be prepared wherein the monomer solution includes water, the first monomer, a reactive optical brightener comonomer, a neutralization agent and a monomer crosslinking agent. The monomer solution may be prepared by mixing the first monomer and reactive optical brightener comonomer in any order. In addition, the monomer solution may be prepared by starting with the first monomer and then adding the reactive optical brightener comonomer to the monomer solution. In another embodiment of preparing two monomer solutions, the first monomer solution is prepared including water, the first monomer and neutralization agent, and the second monomer solution including a monomer crosslinker agent and the reactive optical brightener comomoner solution or the reactive optical brightener comonomer.

The superabsorbent copolymer of the invention also includes internal crosslinking agents, which may be referred to as monomer crosslinking agents. The term crosslinked used in reference to the superabsorbent copolymer refers to any means for effectively rendering normally water-soluble copolymer substantially a water-insoluble but swellable copolymer. Such a crosslinking means can include for example, physical entanglement, crystalline domains, covalent bonds, ionic complexes and associations, hydrophilic associations such as hydrogen bonding, hydrophobic associations, Van der Waals forces, or dipole-dipole interactions.

The monomer crosslinking agents or their mixtures to be used according to the present invention are used in amounts of from about 0.001 wt % to about 5 wt % or from about 0.01 wt % to about 4 wt %, or from about 0.2 wt % to about 3 wt % based on the total amount of the first monomer.

The internal crosslinking agent may have at least two ethylenically unsaturated double bonds or one ethylenically unsaturated double bond and one functional group which is reactive towards acid groups of the polymerizable unsaturated acid group containing monomers or several functional groups which are reactive towards acid groups can be used as the internal crosslinking component and which is present during the polymerization of the polymerizable unsaturated acid group containing monomers.

Examples of monomer internal crosslinking agents include aliphatic unsaturated amides, such as methylenebisacryl- or -methacrylamide or ethylenebisacrylamide, and furthermore aliphatic esters of polyols or alkoxylated polyols with ethylenically unsaturated acids, such as di(meth)acrylates or tri(meth)acrylates of butanediol or ethylene glycol, polyglycols or trimethylolpropane, di- and triacrylate esters of trimethylolpropane which is preferably oxyalkylated, preferably ethoxylated, with 1 to 30 mol of alkylene oxide, acrylate and methacrylate esters of glycerol and pentaerythritol and of glycerol and pentaerythritol oxyethylated with preferably 1 to 30 mol of ethylene oxide and furthermore allyl compounds, such as allyl (meth)acrylate, alkoxylated allyl (meth)acrylate reacted with preferably 1 to 30 mol of ethylene oxide, triallyl cyanurate, triallyl isocyanurate, maleic acid diallyl ester, poly-allyl esters, tetraallyloxyethane, triallylamine, tetraallylethylenediamine, diols, polyols, hydroxy allyl or acrylate compounds and allyl esters of phosphoric acid or phosphorous acid, and furthermore monomers which are capable of crosslinking, such as N-methylol compounds of unsaturated amides, such as of methacrylamide or acrylamide, and the ethers derived there from. Ionic crosslinkers such as multivalent metal salts may also be employed. Mixtures of the crosslinking agents mentioned can also be employed.

In another embodiment, the superabsorbent copolymer may include from about 0.001 to about 0.5 wt % based on the first monomer of a second internal crosslinker which may comprise compositions comprising at least two ethylenically unsaturated double-bonds, for example, methylenebisacrylamide or -methacrylamide or ethylenebisacrylamide; additionally, esters of unsaturated mono- or polycarboxylic acids of polyols, such as, diacrylates or triacrylates, e.g., butanediol- or ethylene glycol diacrylate or -methacrylate; trimethylolpropane triacrylate, as well as their alkoxylated derivatives; additionally, allyl compounds, such as allyl (meth)acrylate, triallyl cyanurate, maleic acid diallyl ester, polyallyl ester, tetraallyloxyethane, di- and triallylamine, tetrallylethylenediamine, allyl esters of phosphoric acid or phosphorous acid. Moreover, compounds having at least one functional group reactive towards acid groups may also be used. Examples thereof include N-methylol compounds of amides, such as methacrylamide or acrylamide, and the ethers derived therefrom, as well as di- and polyglycidyl compounds.

The process to make the superabsorbent copolymer of the present invention may also include from about 50 to 1000 ppm of an initiator based on the first monomer. Thermal initiator(s) may include persulfates such as sodium persulfate, potassium persulfate, and ammonium persulfate; peroxides such as benzoyl peroxide, t-butyl peroxide, and methyl ethyl ketone peroxide; peroxyesters such as t-butylperoxypivalate, t-amylperoxypivalate, t-amylperoxy-2-ethylhexanoate and t-butylperoxyisobutyrate; and azo compounds such as azonitrile compounds, azoamidine compounds, cyclic azoamidine compounds, azoamide compounds, alkylazo compounds, 2,2'-azobis(2-amidinopropane)dihydrochloride, and 2,2'-azobis(2-(2-imidazolin-2-yl)propane)dihydrochloride.

The process to make the superabsorbent copolymer of the present invention may also include initiators used for initiation of the free-radical polymerization. Suitable initiators include, but are not limited to, azo or peroxo compounds, redox systems or UV initiators, sensitizers, and/or radiation. After polymerization, the superabsorbent copolymer becomes a crosslinked superabsorbent copolymer hydrogel, which is then granulated into superabsorbent copolymer particles, or what is termed particulate superabsorbent copolymer.

The particulate superabsorbent copolymer may then be surface crosslinked by the addition of a surface crosslinking agent and heat-treatment. In general, surface crosslinking is a process that is believed to increase the crosslink density of the superabsorbent copolymer in the vicinity of the particulate superabsorbent copolymer particle surface with respect to the crosslinking density of the particle interior of the superabsorbent copolymer.

In some particular aspects, desirable surface crosslinking agents include chemicals with one or more functional groups that are reactive toward pendant groups of the polymer chains, typically the acid groups. The surface crosslinking agent may be present in an amount of from about 0.001% to about 5% by weight of the dry superabsorbent copolymer composition, and such as from about 0.1% to about 3% by weight, and such as from about 0.1% to about 1% by weight, based on the weight of the dry superabsorbent copolymer composition. Applicants have found that a heat treatment step after addition of the surface crosslinking agent is desirable.

Surface crosslinking agents are chemical compounds that may contain functional groups capable of reacting with carboxylic acid or carboxyl groups. Surface crosslinking agents may include two functional groups such as some alcohol, amine, aldehyde, and carbonate groups may be used. Crosslinker molecules having multiple different functions may also be employed, such as polyols, polyamines, polyaminoalcohols, and alkylene carbonates. Ethylene glycol, diethylene glycol, triethylene glycol, polyethylene glycol, glycerol, polyglycerol, propylene glycol, diethanolamine, triethanolamine, polypropylene glycol, block copolymers of ethylene oxide and propylene oxide, sorbitan fatty acid esters, ethoxylated sorbitan fatty acid esters, trimethylolpropane, ethoxylated trimethylolpropane, pentaerythritol, ethoxylated pentaerythritol, polyvinyl alcohol, sorbitol, ethylene carbonate, propylene carbonate may be used. Polyols and ethylene carbonate may be used as surface crosslinking agents.

Surface crosslinking agents may be an alkylene carbonate, such as ethylene carbonate, followed by heating to effect surface crosslinking, which can improve the surface crosslinking density and the gel strength characteristics of the superabsorbent polymer particle. More specifically, the surface crosslinking agent is coated onto the superabsorbent polymer particulate by mixing the polymer particulate with an aqueous alcoholic solution of the alkylene carbonate surface crosslinking agent. The amount of alcohol is determined by the solubility of the alkylene carbonate and is kept as low as possible for various reasons. Suitable alcohols are methanol, isopropanol, ethanol, butanol, or butyl glycol, as well as mixtures of these alcohols. In some aspects, the solvent desirably is water, which typically is used in an amount of about 0.3 wt % to about 5.0 wt %, based on the weight of the dry superabsorbent polymer. In other aspects, the alkylene carbonate surface crosslinking agent is dissolved in water without any alcohol. In still other aspects, the alkylene carbonate surface crosslinking agent may be applied from a powder mixture, for example, with an inorganic carrier material, such as particulate silicone dioxide ($SiO_2$), or in a vapor state by evaporation of the alkylene carbonate.

To achieve the desired surface crosslinking properties, the alkylene carbonate is distributed evenly on the particulate superabsorbent copolymer. For this purpose, mixing is effected in suitable mixers known in the art, such as fluidized bed mixers, paddle mixers, rotary drum mixers, or twin-worm mixers. It is also possible to carry out the coating of the particulate superabsorbent copolymer during one of the process steps in the production of the particulate superabsorbent copolymer.

The heat treatment, which may follow the coating treatment, may be carried out as follows. In general, the heat treatment is at a temperature of from about 100° C. to about 300° C. Lower temperatures are possible if highly reactive epoxide crosslinking agents are used. However, if alkylene carbonates are used, then the thermal treatment is suitably at a temperature of from about 150° C. to about 250° C. In this particular aspect, the treatment temperature depends on the dwell time and the kind of alkylene carbonate. For example, at a temperature of about 150° C., the thermal treatment is carried out for one hour or longer. In contrast, at a temperature of about 250° C., a few minutes (e.g., from about 0.5 minutes to about 5 minutes) are sufficient to achieve the desired surface cross-linking properties. The thermal treatment may be carried out in conventional dryers or ovens known in the art.

In one embodiment of the superabsorbent copolymer of the present invention, from about 0.1 to about 10,000 ppm, or from about 0.1 to about 1000 ppm, or from about 0.1 to about 300 ppm based on the superabsorbent copolymer of a reactive optical brightener comonomer, as set forth herein, may be added to the surface of the particles to react with the pendant groups of the polymer chains, typically in polyacrylates, the acid groups in a similar way as the surface cross linking agent and the heat treatment.

The superabsorbent copolymer composition of the invention may further include from about 0.001% to about 5% by weight, or from about 0.005 to about 2% by weight, or from about 0.01 to 1% by weight of a at least one color stabilizer based on the superabsorbent copolymer. The color stabilizer may be added either to the monomer solution or to the polymerized product whether in crosslinked hydrogel or subsequent superabsorbent copolymer particles. The addition of color stabilizers can further suppress the discoloration tendency of the superabsorbent copolymer.

Suitable color stabilizers are all known antioxidants and reducing agents, and compounds which release reducing agents. Suitable antioxidants are sterically hindered phenols such as 2,6-bis-tert-butylmethylphenol or calcium bis[monoethyl(3,5-di-tert-butyl-4-hydroxybenzyl)phosphonate], or organic phosphites such as tris(2,4-di-tert-butylphenyl) phosphite. Suitable reducing agents are sodium hypophosphite, potassium hypophosphite, sodium phosphite, potassium phosphite, sodium hydrogensulfite, potassium hydrogensulfite, sodium sulfite, potassium sulfite, sodium dithionite, potassium dithionite, sodium glyoxylate and potassium glyoxylate. Suitable compounds which release reducing agents are derivatives of glyoxylic acid, such as disodium 2-hydroxy-2-sulfonatoacetate, dipotassium 2-hydroxy-2-sulfonatoacetate, disodium 2-hydroxy-2-phosphonoacetate, dipotassium 2-hydroxy-2-phosphonoacetate, sodium 2,2-dimethoxyacetate, potassium 2,2-dimethoxyacetate, sodium 2,2-diethoxyacetate and potassium 2,2-diethoxyacetate.

In particular, the color stabilizer may be selected from a sulfite or bisulfite of an alkali metal, ammonium sulfite, sodium metabisulfite, ammonium bisulfite, sulfinic acid, 2-hydroxy-2-sulfinatoacetic acid, 2-hydroxy-2-sulfonatoacetic acid, 2-hydroxy-2-sulfonatoacetic acid, sulfamic acid, or sulfonic acid, and salts and derivatives of the foregoing. 2-Hydroxy-2-sulfinatoacetic acid and 2-hydroxy-2-sulfonatoacetic acid in sodium salt forms (a pure form), in combination with sodium bisulfite are available commercially from Bruggemann Chemical, Heilbron, Germany, as BRUGGOLITE® FF6 and BRUGGOLITE® FF7 reducing agents. 2-Hydroxy-2-sulfinatoacetic acid derivatives are disclosed in example 3 of U.S. Pat. No. 6,211,400, wherein example 3 of U.S. Pat. No. 6,211,400, is incorporated herein by reference.

The superabsorbent copolymer of the invention may include further treatment of the surface, wherein such components may be added before, during, or after surface crosslinking. The particulate superabsorbent copolymer composition of the invention may include up to about 5 wt % by weight, or from about 0.01 wt % to about 3 wt % of the dry superabsorbent copolymer composition of a chelating agent such as, for example, an aminocarboxylic acid metal chelating agent such as iminodiacetic acid, hydroxyethyl iminodiacetate, nitrilotriacetic acid, nitrilotripropionic acid, ethylenediaminetetraacetic acid, diethylenetriaminepentaacetic acid, pentasodium diethylenetriaminepentaacetate, triethylenetetraminehexaacetic acid, trans-1,2-diaminocyclohexanetetraacetic acid, N,N-bis(2-hydroxyethyl)glycine, diaminopropanoltetraacetic acid, ethylenediaminedipropionic acid, hydroxyethylenediaminetriacetic acid, glycoletherdiaminetetraacetic acid, diaminopropanetetraacetic acid, N,N'-bis(2-hydroxybenzyl)ethylenediamine-N,N-diacetic acid, 1,6-hexamethylenediamine-N,N,N',N'-tetraacetic acid and salts thereof; a polyphosphoric acid metal chelating agent such as pyrophosphoric acid, tripolyphosphoric acid, tetrapolyphosphoric acid, trimetaphosphoric acid, tetrametaphosphoric acid, and salts thereof. Chelating agents may be a pentasodium diethylenetriaminepentaacetate such as Versenex®80 chelating agent that is commercially available from The Dow Chemical Company. Versenex®80 chelating agent is an aqueous solution of the pentasodium salt of diethylenetriaminepentaacetic acid.

In some aspects, the superabsorbent copolymer of the present invention may include up to about 5% by weight, and from about 0.001% to about 5% by weight, and from about 0.01% to about 0.5% by weight of the dry superabsorbent copolymer composition of a polymeric coating, such as a thermoplastic coating, or a cationic coating, or a combination of a thermoplastic coating and a cationic coating. In some particular aspects, the polymeric coating desirably is a polymer that may be in a solid, emulsion, suspension, colloidal, or solubilized state, or combinations thereof. Polymeric coatings suitable for this invention may include, but are not limited to, a thermoplastic coating having a thermoplastic melt temperature wherein the polymeric coating is applied to the particle surface coincident with or followed by a temperature of the treated superabsorbent polymer at about the thermoplastic melt temperature.

Examples of thermoplastic polymers include, but are not limited to, polyolefin, polyethylene, polyester, polyamide, polyurethane, styrene polybutadiene, linear low density polyethylene (LLDPE), ethylene acrylic acid copolymer (EAA), ethylene alkyl methacrylate copolymer (EMA), polypropylene (PP), maleated polypropylene, ethylene vinyl acetate copolymer (EVA), polyester, polyamide, and blends of all families of polyolefins, such as blends of PP, EVA, EMA, EEA, EBA, HDPE, MDPE, LDPE, LLDPE, and/or VLDPE, may also be advantageously employed. The term polyolefin as used herein is defined above. A thermoplastic polymer may be functionalized to have additional benefits such as water solubility or dispersability.

Polymeric coatings of this invention may also include a cationic polymer. A cationic polymer as used herein refers to a polymer or mixture of polymers comprising a functional group or groups having a potential of becoming positively charged ions upon ionization in an aqueous solution. Suitable functional groups for a cationic polymer include, but are not limited to, primary, secondary, or tertiary amino groups, imino groups, imido groups, amido groups, and quaternary ammonium groups. Examples of synthetic cationic polymers include, but are not limited to, the salts or partial salts of poly(vinyl amines), poly(allylamines), poly(ethylene imine), poly(amino propanol vinyl ethers), poly(acrylamidopropyl trimethyl ammonium chloride), poly(diallyldimethyl ammonium chloride). Poly(vinyl amines) includes, but is not limited to, LUPAMIN® 9095 available from BASF Corporation, Mount Olive, N.J. Examples of natural-based cationic polymers include, but are not limited to, partially deacetylated chitin, chitosan, and chitosan salts. Synthetic polypeptides such as polyasparagins, polylysines, polyglutamines, and polyarginines are also suitable cationic polymers.

The superabsorbent copolymer according to the invention may include from 0 wt % to about 5 wt %, or from 0.05 wt % to about 2.0 wt %, of a multivalent metal salt, based on the dry particulate superabsorbent copolymer composition. The multivalent metal salt may be applied to the surface of the particulate superabsorbent copolymer composition. The multivalent metal salt is preferably water soluble. Examples of preferred metal cations include the cations of Al, Fe, Zr, Mg and Zn. Preferably, the metal cation has a valence of at least +3, with Al being most preferred. Examples of preferred anions in the multivalent metal salt include halides, chlorohydrates, sulfates, lactates, nitrates and acetates, with chlorides, sulfates, chlorohydrates and acetates being preferred, chlorohydrates and sulfates being more preferred and sulfates are the most preferred. Aluminum sulfate and aluminum lactate are examples of multivalent metal salt and are readily commercially available. The multivalent metal salt may be aluminum sulfate such as hydrated aluminum sulfate, such as aluminum sulfate having from 12 to 14 waters of hydration. The multivalent metal salt may be aluminum lactate. Mixtures of multivalent metal salts can be employed.

The superabsorbent copolymer and multivalent metal salt may be mixed by dry blending, or in a solution, or in an aqueous solution, using means well known to those skilled in the art. With dry blending, a binder may be employed in an amount which is sufficient to ensure that a substantially uniform mixture of the salt and the superabsorbent copolymer is maintained. The binder may be water or a nonvolatile organic compound having a boiling point of at least 150° C. Examples of binders include water, polyols such as propylene glycol, glycerin and poly(ethylene glycol).

The superabsorbent copolymer according to the invention may include from about 0 wt % to about 5 wt %, or from about 0.001 wt % to about 3 wt %, or from about 0.01 wt % to about 2 wt % of water-insoluble, inorganic powder. Examples of insoluble, inorganic powders include silicon dioxide, silica, titanium dioxide, aluminum oxide, magnesium oxide, zinc oxide, talc, calcium phosphate, clays, diatomataceous earth, zeolites, bentonite, kaolin, hydrotalcite, activated clays, etc. The insoluble inorganic powder additive may be a single compound or a mixture of compounds selected from the above list. Examples of silica include fumed silica, precipitated silica, silicon dioxide, silicic acid, and silicates. In some particular aspects, microscopic amorphous noncrystalline silicon dioxide is desirable. In some aspects, the particle diameter of the inorganic powder can be 1,000 μm or smaller, such as 100 μm or smaller.

In some aspects, the superabsorbent copolymer may also include from 0 wt % to about 30 wt % of the dry superabsorbent copolymer composition, such as from about 0.1 wt % to about 5 wt %, of water-soluble polymers based by weight of the dry superabsorbent copolymer, of partly or completely hydrolyzed polyvinyl acetate, polyvinylpyrrolidone, starch or starch derivatives, polyglycols, polyethylene oxides, polypropylene oxides, or polyacrylic acids.

The superabsorbent copolymer may also include from 0 to about 5 wt %, or from about 0.001 wt % to about 3 wt %, or from about 0.01 to about 2 wt % of dedusting agents, such as hydrophilic and hydrophobic dedusting agents such as those described in U.S. Pat. Nos. 6,090,875 and 5,994,440 may also be employed in the process of the invention.

In some aspects, additional surface additives may optionally be employed with the superabsorbent copolymer, such as odor-binding substances, such as cyclodextrins, zeolites, inorganic or organic salts, and similar materials; anti-caking additives, flow modification agents, surfactants, viscosity modifiers, and the like. In addition, surface additives may be employed that perform several roles during surface modifications. For example, a single additive may be a surfactant, viscosity modifier, and may react to crosslink polymer chains.

In some aspects, the superabsorbent copolymer of the present invention may, after a heat treatment step, be treated with water so that the superabsorbent copolymer has water content of up to about 15 wt % of the superabsorbent copolymer composition. This water may be added with one or more of the surface additives from above added to the particulate superabsorbent copolymer composition.

The superabsorbent copolymer according to the invention may be desirably prepared by various methods disclosed in the art including the following two methods. The particulate superabsorbent copolymer composition may be prepared continuously or discontinuously in a large-scale industrial manner, the surface treatment including surface crosslinking being carried out according to the invention.

According to one method, the monomer is partially neutralized by either adding a caustic such as sodium hydroxide to the monomer or adding the monomer to the caustic. The reactive optical brightener comonomer is added to the monomer. Then the partially neutralized monomer, such as acrylic acid, is converted into a gel by free-radical polymerization in aqueous solution in the presence of crosslinking agents and any further components, and the gel is comminuted, dried, ground, and sieved off to the desired particle size, thereby forming a particulate superabsorbent copolymer. This polymerization can be carried out continuously or discontinuously.

For the present invention, the size of the high-capacity superabsorbent copolymer is dependent on manufacturing processes including milling and sieving. It is well known to those skilled in the art that particle size distribution of the particulate superabsorbent polymer composition resembles a normal distribution or a bell shaped curve. It is also known that for various reasons, the normal distribution of the particle size distribution may be skewed in either direction.

The particulate superabsorbent copolymer, of the present invention, may generally include particle sizes ranging from about 50 to about 1000 µm, or from about 150 to about 850 µm. The present invention may include at least about 40 wt % of the particles having a particle size from about 300 µm to about 600 µm, or at least about 50 wt % of the particles having a particle size from about 300 µm to about 600 µm, or at least about 60 wt % of the particles having a particle size from about 300 µm to about 600 µm as measured by screening through a U.S. standard 30 mesh screen and retained on a U.S. standard 50 mesh screen. In addition, the size distribution of the particulate superabsorbent copolymer of the present invention may include less than about 30 wt % of particles having a size greater than about 600 µm, and less than about 30% by weight of particles having a size of less than about 300 µm as measured using for example a RO-TAP® Mechanical Sieve Shaker Model B available from W. S. Tyler, Inc., Mentor Ohio.

While the form of particles may be used by way of example of the physical form of superabsorbent copolymer composition, the invention is not limited to this form and is applicable to other forms such as fibers, foams, films, beads, rods, and the like, as discussed above.

According to another method, inverse suspension and emulsion polymerization can also be used for preparation of the superabsorbent copolymer according to the invention. According to these processes, an aqueous, partly neutralized solution of monomer, such as acrylic acid, is dispersed in a hydrophobic, organic solvent with the aid of protective colloids and/or emulsifiers, and the polymerization is started by free radical initiators. As before, the unsaturated, reactive optical brightener comonomer is added to the monomer. The internal crosslinking agents may be either dissolved in the monomer solution and are metered in together with this, or are added separately and optionally during the polymerization. The addition of a water-soluble polymer as the graft base optionally takes place via the monomer solution or by direct introduction into the organic solvent. The water is then removed azeotropically from the mixture, and the polymer is filtered off and optionally dried. Internal crosslinking can be carried out by polymerizing in a polyfunctional crosslinking agent dissolved in the monomer solution and/or by reaction of suitable crosslinking agents with functional groups of the polymer during the polymerization steps.

The result of these methods is an superabsorbent copolymer preproduct. A superabsorbent copolymer preproduct as used herein is produced by repeating all of the steps for making the superabsorbent copolymer, up to and including drying the material, and coarse grinding in a crusher, and removing particulate superabsorbent copolymer greater than about 850 µm and smaller than about 150 µm.

The superabsorbent copolymer of the present invention may exhibit certain characteristics, or properties, as measured by certain blueness characteristics as measured by color coordinate, b*. All values of b* herein are to be understood as being determined by the test for b* as provided herein. A method to evaluate the yellow-blue balance of the superabsorbent copolymer is to use what is called b* which generally refers to one coordinate of the CIE L*a*b* color space specified by the International Commission on Illumination. The b* coordinate specifies the color position between yellow and blue (b*, negative values indicate blue and positive values indicate yellow). As used herein, a b* may be from about −1 to about 8, as specified by the International Commission on Illumination.

The superabsorbent copolymer according to the present invention may be employed in many products including sanitary towels, diapers, or wound coverings, and they have the property that they rapidly absorb large amounts of menstrual blood, urine, or other body fluids. Since the agents according to the invention retain the absorbed liquids even under pressure and are also capable of distributing further liquid within the construction in the swollen state, they are more desirably employed in higher concentrations, with respect to the hydrophilic fiber material, such as fluff, when compared to conventional current superabsorbent compositions. They are also suitable for use as a homogeneous superabsorber layer without fluff content within the diaper construction, as a result of which particularly thin articles are possible. The superabsorbent copolymer is furthermore suitable for use in hygiene articles (incontinence products) for adults.

Absorbent articles generally include a core which may include from about 60 to 100 wt % of particulate superabsorbent copolymer, or may be a fibrous web including 0 to about 40 wt % of fibrous web such as cellulose, or the core may include at least about 90 wt % superabsorbent copolymer and up to 10 wt % of cellulose fiber, or may include at least about 95 wt % of particulate superabsorbent copolymer and up to about 5 wt % of nanofiber fibers wherein the nanofibers include fibers having a diameter of less than about 10 μm, or less than about 1 μm.

Absorbent articles, like diapers, may include (a) a liquid pervious topsheet; (b) a liquid impervious backsheet; (c) a core positioned between (a) and (b) and comprising about 10 wt % to 100 wt %, and or about 50 wt % to 100 wt %, by weight of the present superabsorbent copolymer, and 0 wt % to 90 wt % of hydrophilic fiber material; (d) optionally a tissue layer positioned directly above and below said core (c); and (e) optionally an acquisition layer.

The superabsorbent copolymer according to the invention may also be employed in absorbent articles that are suitable for further uses. In particular, the superabsorbent copolymer composition of this invention can be used in absorbent compositions for absorbents for water or aqueous liquids in packaging materials, in constructions for plant growing, as soil improvement agents, or as active compound carriers. For this, they are processed into a web by mixing with paper or fluff or synthetic fibers or by distributing the superabsorbent copolymer composition between substrates of paper, fluff, or nonwoven textiles, or by processing into carrier materials.

Another feature of the present invention is that absorbent articles including a superabsorbent copolymer may be traced or tagged by the use of ultraviolet A, long wave, or black light (UV-A) to stimulate the fluorescene of the optical brightener in the superabsorbent copolymer in the core. Other wavelengths (UV-B or UV-C) may work too, mainly depending on the extinction coefficient.

Further embodiments of the present invention include: A process for producing a superabsorbent copolymer by a) polymerizing a monomer solution comprising:

i) from about 55% to about 99.9% by weight of a first monomer based on the superabsorbent copolymer;

ii) from about 0.001% to about 5% by weight of internal crosslinking agent based on the first polymerizable monomer; and iii) from about 0.1 to 10,000 ppm of a reactive optical brightener comonomer based on the superabsorbent copolymer; and iv) from about 50 to 1000 ppm of a thermal initiator based on the first monomer;

wherein the first monomer comprises a polymerizable unsaturated acid group containing monomer;

wherein the first monomer comprises acrylic acid;

wherein the process further comprises the steps of b) making particulate superabsorbent copolymer; or c) surface crosslinking the particulate superabsorbent copolymer with a surface crosslinking agent to make a surface crosslinked particulate superabsorbent copolymer; or d) surface treating the surface crosslinked particulate superabsorbent copolymer with a multivalent metal salt; or e) surface treating the superabsorbent copolymer with a reactive optical brightener comonomer;

wherein the reactive optical brightener comonomer may be any of those set forth herein; and a mixture comprising a) a superabsorbent copolymer comprising from about from 0.1 to about 10,000 ppm based on the superabsorbent copolymer of a reactive optical brightener comonomer comprising a pyrene derivative wherein the ethylenically unsaturated, reactive optical brightener comonomer is a fluorescent tracer; and b) a superabsorbent polymer not containing a reactive comonomer optical brightener.

Test Procedures

Method for Color Measurement of Color Coordinate b*

A HunterLab ColorFlex 45/0 device placed in 'Daylight Color' mode is used for this test method. Using the standard white and black tiles found in the ColorFlex Standards Box, the unit is calibrated every 4 hours. Other manufacturer-specified maintenance and calibrations are followed, as well. The full-particle size range (150-850 μm) of the sample is placed in a HunterLab 'Sample Cup' #04720900G so that it completely covers the bottom surface of the glass and is at least 1 cm deep. At this point, the $L^*$, $a^*$, and $b^*$ values are measured and recorded.

Water Content

The amount of water content, measured as "% moisture," can be measured as follows: 1) Weigh 4.5-5.5 grams of superabsorbent copolymer (SAP) accurately in a pre-weighed aluminum weighing pan; 2) place the SAP and pan into a standard lab oven preheated to 150° C. for 30 minutes; 3) remove and re-weigh the pan and contents; and 4) calculate the percent moisture using the following formula:

$$\% \text{ Moisture} = \{((\text{pan wt} + \text{initial SAP wt}) - (\text{dried SAP \& pan wt})) * 100\} / \text{dried SAP wt}$$

EXAMPLES

The present invention may be better understood with reference to the following examples directed to some embodiments of the superabsorbent copolymer as set forth herein. The following examples and preproducts for the examples are provided to illustrate the superabsorbent copolymer of the present invention and do not limit the scope of the claims. Unless otherwise stated all parts, and percentages are by weight.

Reactive Optical Brightener Comonomer 1 (OBC 1)

The following process is meant to provide details on making an OBC for the superabsorbent copolymer of the present invention.

OBC 1 as described herein generally may be called 8-[(4-ethenylphenyl)methoxy]-1,3,6-pyrenetrisulfonic acid, trisodium salt or 4-vinylbenzylpyranine, or 8-(4-vinylbenzyloxy)-1,3,6-pyrenetrisulfonic acid, trisodium salt.

13.1 g of pyranine were put in a 250 ml round bottom flask with 100 g dry DMSO and stirred under nitrogen for 20 minutes. 3.5 g of a 50 wt. % aqueous NaOH solution were added and the reaction mixture was stirred for another 30 minutes. Then, in one portion, 5.5 g of 4-chloromethyl styrene (technical grade) were added and the reaction mixture was stirred for 24 hours at ambient temperature and until a droplet of the reaction mix in 10 ml de-ionized water showed no green fluorescence. After that time, all solid precipitates were removed by filtration. 300 ml of acetone were added to the filtrate in order to precipitate the desired reaction product. After filtration, the yellow precipitate was washed with acetone twice and dried to give 8-[(4-ethenylphenyl)methoxy]-1,3,6-pyrenetrisulfonic acid, trisodium salt.

Reactive Optical Brightener Comonomer 2 (OBC2)

OBC2 as described herein generally may be called 8-allyloxy-1,3,6-pyrenetrisulfonic acid, trisodium salt or allylpyranine. The synthesis of the pyranine derivative was done using allylbromide as alkylating agent.

13.1 g of pyranine were put in a 250 ml round bottom flask with 100 g dry DMSO and stirred under nitrogen for 20 minutes. 3.5 g of a 50 wt.-% aqueous NaOH solution were added and the reaction mixture was stirred for another 30 minutes. Then, in one portion, 4.25 g of allylbromide were added and the reaction mixture was stirred for 24 hours at ambient temperature and until a droplet of the reaction mix in 10 ml de-ionized water showed no further green fluorescence. After that time, all solid precipitates were removed by filtration. 300 ml of acetone were added to the filtrate in order to precipitate the desired reaction product. After filtration, the yellow precipitate was washed with acetone twice and then dried to give 8-allyloxy-1,3,6-pyrenetrisulfonic acid, trisodium salt.

Synthesis of Superabsorbent Base Polymer

SAP I

A superabsorbent polymer referred herein as SAP I may be prepared in accordance with the following procedure. 829.6 g de-ionized (DI) water and 500 g of a 50 wt %, aqueous solution of sodium hydroxide (NaOH) were poured into a reactor. 500 g of a 50 wt %, aqueous solution of sodium hydroxide (NaOH) were added to the DI water. The mixture was cooled to below 15° C. and agitated with a magnetic stirrer. 200 g of glacial acrylic acid (GAA) was added to the cooled NaOH solution and the reaction mixture was cooled to below 15° C. Preparing a second portion of GAA including 1.2 g ethoxylated trimethylolpropane triacrylate and 1.2 g polyethylene glycol monoallyl ether acrylate (PEGMAE), 10 EO) were dissolved in 400 g of GAA. After ensuring homogeneity, the acrylic acid solution was added to the reactor, which was then cooled to 5° C. The monomer solution was sparged with nitrogen gas ($N_2$) for 5 minutes for oxygen removal. The monomer solution was then polymerized by the addition of 20 g of a 1 wt %, aqueous, hydrogen peroxide ($H_2O_2$) solution, and 30 g of a 2 wt % aqueous, sodium persulfate ($Na_2S_2O_8$) solution under adiabatic conditions and held near $T_{max}$ for 25 minutes. The resulting polymer gel was chopped and extruded with a HOBCrth 4M6 commercial extruder followed by drying in a Proctor & Schwartz, Inc. model 062 oven preheated to 175° C. with air flowing upward through the material bed. After 12 minutes, the air flow was switched so that it passed through the material in the downward direction for an additional 6 minutes. Dry samples of the superabsorbent polymer were allowed to cool to ambient temperature and were then manually crushed to obtain pieces no larger than 0.5 inches in diameter. The crushed superabsorbent polymer was then milled in a Retsch ZM 1000 and sieved with a Minox MTS 600DS3V sieving device to result in the particulate superabsorbent particle polymer having a particle size in the range of range of 150-850 μm.

200 g of the particulate superabsorbent polymer was then placed into a KitchenAid series KSM150 mixing bowl with lid and whisk. An aqueous solution containing 20 wt % ethylene carbonate (EC) was prepared so that a 1 wt % add-on of the EC and a 4 wt % add-on of the DI water can be sprayed on using a spray gun. Then, the machine was stopped, and 0.5 g precipitated silica were placed in the mixing bowl along with the SAP and mixed for 60 seconds. The coated superabsorbent polymer was then heated for 60 minutes at 185° C. in a non-vented, static convection oven.

SAP II

The preparation of superabsorbent polymer II, referred herein as SAP II, is the same as SAP I except that the PEGMAE is replaced by tetrakis-N,N,N',N'-[3-allyloxy-2-hydroxypropyl]-ethylene diamine in the amount of 1.5 g. Additionally, the amount of TMPTA-3EO is reduced to 0.21 g, and the total DI water in the recipe was adjusted to give a total final monomer solution of 2000 g.

SAP III

Preparation of superabsorbent polymer III, referred herein as SAP III is the same as SAP I except that the TMPTA-3EO and the PEGMAE is replaced by PEG300-DA in the amount of 3.6 g. Additionally, 60 mg of DETA (diethylene triamine) was added, and the total DI water in the recipe was adjusted to give a total final monomer solution of 2000 g.

SAP IV

Preparation of superabsorbent polymer IV, referred herein as SAP IV is the same as SAP I except that the PEGMAE is replaced by 1-allyloxy-2-hydroxy-3-diallylamino propane in the amount of 1.2 g. The amount of TMPTA-3EO was reduced to 0.21 g. The total DI water in the recipe was adjusted to give a total final monomer solution of 2000 g.

SAP V

The preparation of superabsorbent polymer V, referred herein as SAP V is the same as for SAP I except that the TMPTA-3EO and the PEGMAE were replaced by TAA (triallyl amine) in the amount of 1.2 g. The total DI water in the recipe was adjusted to give a total final monomer solution of 2000 g.

Preparation of Examples 1-16 of Superabsorbent Copolymer

The superabsorbent copolymers of Examples 1-16 as shown in Tables 1 to 5 were prepared by adding the specified reactive optical brightener comonomer (OBC) into any of the synthesis for making the specified superabsorbent base polymer according to the above mentioned procedure. The OBC was dissolved in DI water to make a 1% stock solution. The amount of OBC solution specified in the table was added to the second portion of GAA in form of the above mentioned aqueous solution together with the respective crosslinkers. Any extra water added to this recipe via the OBC was subtracted from the initial DI water addition of the formulation so that the total DI water is not changed upon OBC solution addition Examples 1-10 and Comparative Examples 1-4

The following data are Examples 1-10 of superabsorbent copolymer of the present invention and Comparative Examples of superabsorbent polymer without OBC. The ppm amount of the OBC 1 is indicated for each Example.

TABLE 1

| Examples and Comparative Examples | OBC 1 (ppm) | Superabsorbent Base Polymer | Color b* |
|---|---|---|---|
| Comparative Example 1 | 0 | SAPI | 5.07 |
| Comparative Example 2 | 0 | SAPI | 4.93 |
| Example 1 | 2.45 | SAPI | 2.89 |
| Example 2 | 4.9 | SAPI | 2.12 |
| Example 3 | 9.8 | SAPI | 0.03 |
| Example 4 | 59 | SAPI | −0.35 |
| Example 5 | 118 | SAPI | −0.58 |
| Comparative Example 3 | 0 | SAPII | 10.57 |
| Comparative Example 4 | 0 | SAPII | 9.79 |
| Example 6 | 5 | SAPII | 7.9 |
| Example 7 | 15 | SAPII | 5.88 |
| Example 8 | 30 | SAPII | 4.33 |
| Example 9 | 100 | SAPII | 0.6 |
| Example 10 | 250 | SAPII | 0.58 |

TABLE 2

| Examples and Comparative Examples | OBC 1 (ppm) | Superabsorbent Base Polymer | Added $FeCl_3$ [ppm] | b* |
|---|---|---|---|---|
| Comparative Example 5 | 0 | SAPI | 0 | 5.81 |
| Comparative Example 6 | 0 | SAPI | 20 | 7.11 |

TABLE 2-continued

| Examples and Comparative Examples | OBC 1 (ppm) | Superabsorbent Base Polymer | Added FeCl₃ [ppm] | b* |
|---|---|---|---|---|
| Comparative Example 7 | 0 | SAP I | 50 | 6.73 |
| Example 11 | 30 | SAP I | 0 | 0.13 |
| Example 12 | 30 | SAP I | 20 | 0.23 |
| Example 13 | 30 | SAP I | 50 | 0.39 |

The following data are Examples 11-13 of superabsorbent copolymer of the present invention and Comparative Examples 5-7 of SAP I without OBC1. The amount of the OBC is indicated for each Example. To get a yellowish to brownish discoloration, FeCl₃ was added to the monomer solution of the base polymer SAP I.

TABLE 3

| Examples and Comparative Examples | OBC 1 [ppm] | Superabsorbent Base Polymer | DETA [ppm] | Color b* |
|---|---|---|---|---|
| Comparative Example 8 | 0 | SAP III | 100 | 6.2 |
| Example 14 | 30 | SAP III | 100 | 0.07 |

The following data is Example 14 of superabsorbent copolymer of the present invention and Comparative Example 8 of SAP III without OBC 1. The ppm amount of the OBC is indicated for each Example.

TABLE 4

| Examples and Comparative Examples | OBC 1 [ppm] | Superabsorbent Base Polymer | Color b* |
|---|---|---|---|
| Comparative Example 9 | 0 | SAP IV | 8.13 |
| Example 15 | 100 | SAP IV | 0.43 |

The following data is Example 15 of superabsorbent copolymer of the present invention and Comparative Example 9 of SAP IV without OBC 1. The ppm amount of the OBC is indicated for Example 15.

TABLE 5

| Examples and Comparative Examples | OBC 1 [ppm] | Superabsorbent Base Polymer | Color b* |
|---|---|---|---|
| Comparative Example 10 | 0 | SAP V | 6.07 |
| Example 16 | 30 | SAP V | 4.13 |

The following data is Example 16 of superabsorbent copolymer of the present invention and Comparative Example 10 of SAP V without OBC 1. The ppm amount of the OBC is indicated for Example 16.

As can be seen in the foregoing Examples, the superabsorbent copolymer made with the reactive optical brightener provides a whiter product and reduces the yellowness of superabsorbent polymers.

Other than in the operating examples of superabsorbent copolymer, or where otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

What is claimed:

1. A superabsorbent copolymer comprising a reaction product of
    a) from 0.00001 wt % to about 1 wt % based on the superabsorbent copolymer of a reactive optical brightener comonomer and a monomer solution comprising
    b) from about 55 wt % to about 99.9 wt % of polymerizable unsaturated acid group containing monomer wherein the polymerizable unsaturated acid group containing monomer is neutralized with a neutralization agent to at least 50 mol %;
    c) from 0.001 wt % to about 5.0 wt % based on the weight of a) of an internal crosslinking agent, wherein the components a), b), and c) are polymerized into a superabsorbent copolymer having a color coordinate b* of from about −1 to about 4.33.

2. The superabsorbent copolymer of claim 1 wherein the reactive optical brightener comonomer reacts with a monomer or pendent groups of a polymer.

3. The superabsorbent copolymer of claim 1 wherein the reactive optical brightener comonomer comprises an ethylenically unsaturated reactive optical brightener comonomer.

4. The superabsorbent copolymer of claim 1 wherein the reactive optical brightener comonomer comprises a pyrene derivative.

5. The superabsorbent copolymer of claim 4 wherein the pyrene derivative is selected from formulas 1-3:

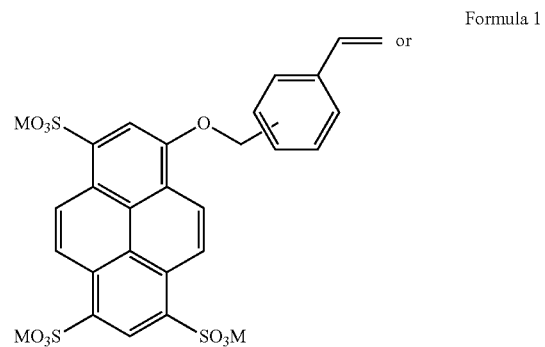

Formula 1

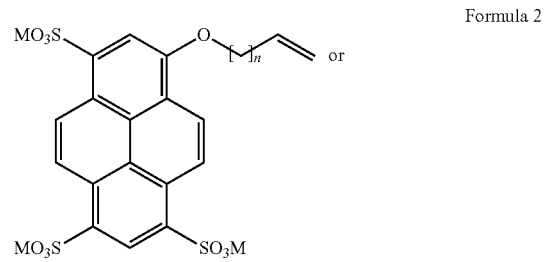

Formula 2

-continued

Formula 3

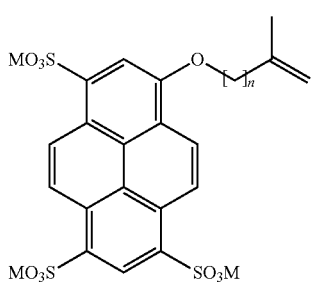

wherein M is selected from sodium, potassium, cesium, rubidium, lithium, ammonium, or hydrogen; and n is selected from 0, 1, 2, 3, 4, 5, 6, 7, 8, 9, or 10.

6. The superabsorbent copolymer of claim 4 wherein the pyrene derivative is selected from formula 4:

Formula 4

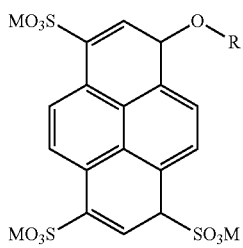

wherein M is selected from sodium, potassium, cesium, rubidium, lithium, ammonium, or hydrogen; and R is an ethylenically unsaturated organic moiety.

7. The superabsorbent copolymer of claim 4 wherein the pyrene derivative is selected from formula 5:

Formula 5

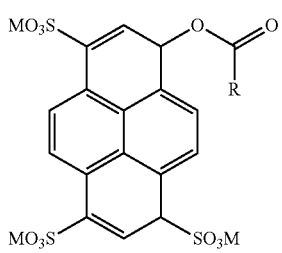

wherein M is selected from sodium, potassium, cesium, rubidium, lithium, ammonium, or hydrogen; and R is an ethylenically unsaturated organic moiety.

8. The superabsorbent copolymer of claim 4 wherein the pyrene derivative is a pyranine derivative.

9. The superabsorbent copolymer of claim 1 wherein the reactive optical brightener comonomer comprises 8-[(4-ethenylphenyl)methoxy]-1,3,6-pyrenetrisulfonic acid.

10. The superabsorbent copolymer of claim 1 wherein the reactive optical brightener comonomer comprises 8-allyloxy-1,3,6-pyrenetrisulfonic acid.

11. A particulate superabsorbent copolymer comprising a reaction product of
a) from 0.00001 wt % to about 1 wt % based on the superabsorbent copolymer of a reactive optical brightener comonomer and
b) a monomer solution comprising
  i) from about 55 wt % to about 99.9 wt % of polymerizable unsaturated acid group containing monomer wherein the polymerizable unsaturated acid group containing monomer is neutralized with a neutralization agent to at least 50 mol %;
  ii) from 0.001 wt % to about 5.0 wt % based on the weight of a) of an internal crosslinking agent,
wherein the components a) and b) are polymerized and granulated into particulate superabsorbent copolymer having a surface;
c) from 0.001 wt % to about 5.0 wt % based on the dry particulate superabsorbent copolymer weight of surface crosslinking agent applied to the surface of the particulate superabsorbent copolymer; wherein the particulate superabsorbent copolymer has a color coordinate b* of from about −1 to about 4.33.

12. The particulate superabsorbent copolymer of claim 11 wherein the polymerizable unsaturated acid group containing monomer comprises acrylic acid.

13. The particulate superabsorbent copolymer of claim 11 wherein the reactive optical brightener comonomer comprises an ethylenically unsaturated reactive optical brightener comonomer.

14. The particulate superabsorbent copolymer of claim 11 wherein the reactive optical brightener comonomer comprises a pyrene derivative.

15. The particulate superabsorbent copolymer of claim 14 wherein the pyrene derivative is selected from formulas 1-3:

Formula 1

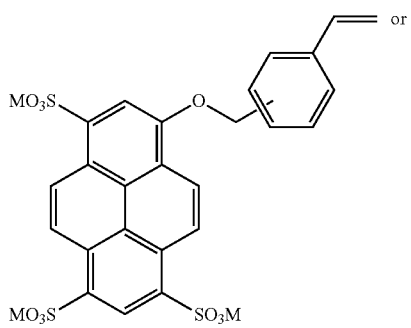

Formula 2

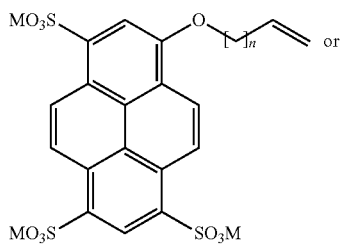

Formula 3

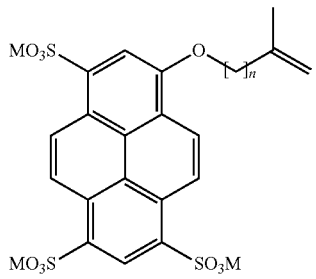

wherein M is selected from sodium, potassium, cesium, rubidium, lithium, ammonium, or hydrogen; and n is selected from 0, 1, 2, 3, 4, 5, 6, 7, 8, 9, or 10.

16. The particulate superabsorbent copolymer of claim 14 wherein the pyrene derivative is selected from formula 4:

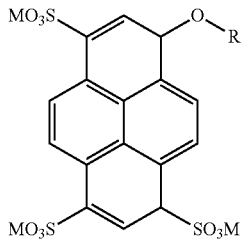

Formula 4 wherein M is selected from sodium, potassium, cesium, rubidium, lithium, ammonium, or hydrogen; and R is an ethylenically unsaturated organic moiety.

17. The particulate superabsorbent copolymer of claim 14 wherein the pyrene derivative is selected from formula 5:

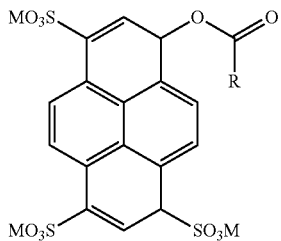

Formula 5 wherein M is selected from sodium, potassium, cesium, rubidium, lithium, ammonium, or hydrogen; and R is an ethylenically unsaturated organic moiety.

18. The particulate superabsorbent copolymer of claim 14 wherein the pyrene derivative is a pyranine derivative.

19. A superabsorbent copolymer comprising a reaction product of a) from 0.00001 wt % to about 1 wt % based on the weight of the superabsorbent copolymer of a reactive optical brightener comonomer and a monomer solution comprising b) from about 55 wt % to about 99.9 wt % of polymerizable unsaturated acid group containing monomer wherein the polymerizable unsaturated acid group containing monomer is neutralized with a neutralization agent to at least 50 mol %;

c) from 0.001 wt % to about 5.0 wt % based on the weight of a) of an internal crosslinking agent, wherein the reactive optical brightener comonomer reacts with the monomer to form network polymer chains in the superabsorbent copolymer wherein the reactive optical brightener comonomer is incorporated into the network polymer chains of the superabsorbent copolymer, and wherein the superabsorbent copolymer has a color coordinate b* of from about −1 to about 4.33.

* * * * *